P. W. SOMMER.
GATE.
APPLICATION FILED JUNE 21, 1915.

1,228,708.

Patented June 5, 1917.
2 SHEETS—SHEET 1.

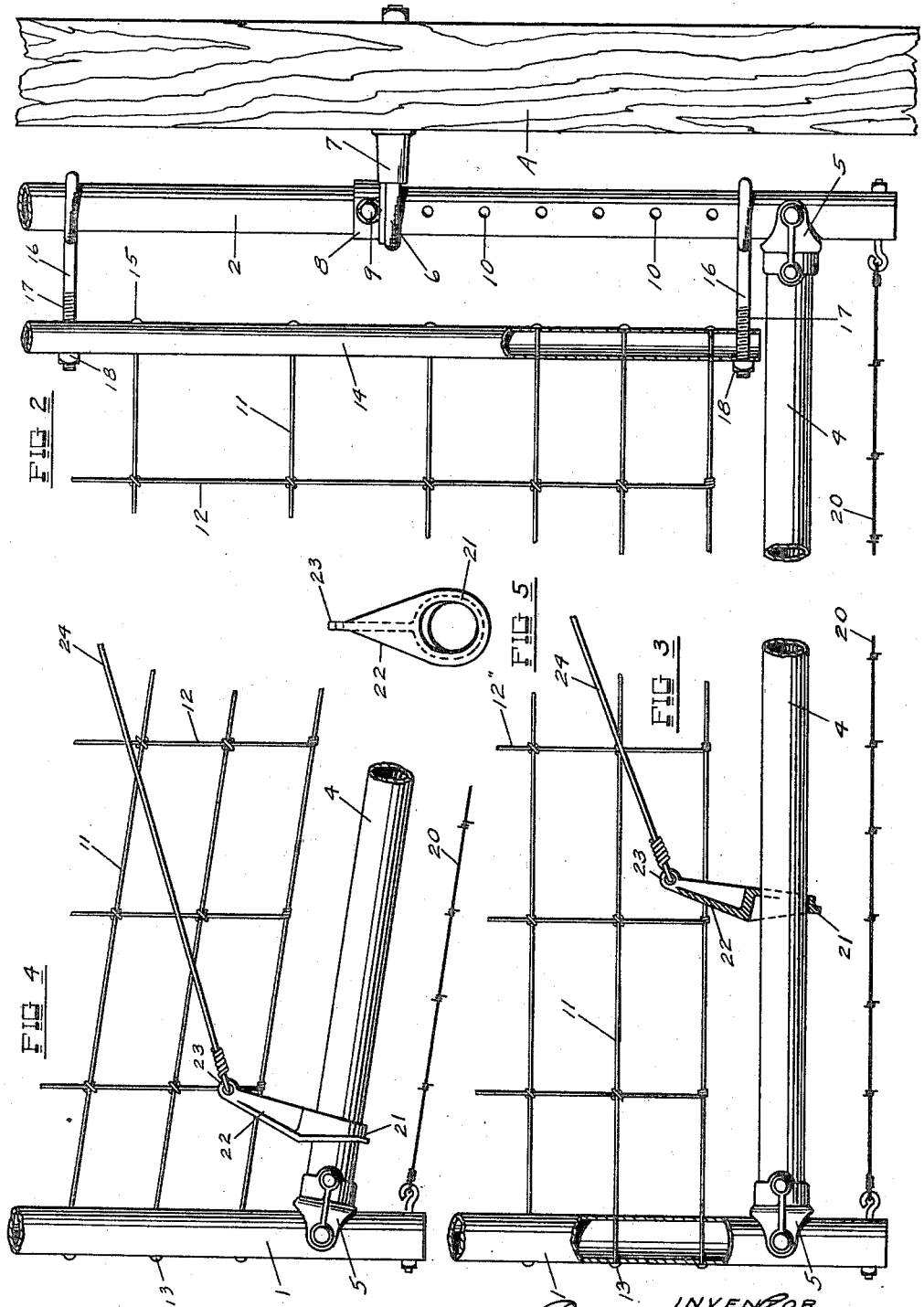

UNITED STATES PATENT OFFICE.

PETER W. SOMMER, OF PEORIA, ILLINOIS, ASSIGNOR, BY MESNE ASSIGNMENTS, TO THE FIRST TRUST AND SAVINGS COMPANY, OF CLEVELAND, OHIO, A CORPORATION OF OHIO, AND WILLIAM E. STONE, OF PEORIA, ILLINOIS, TRUSTEES.

GATE.

1,228,708. Specification of Letters Patent. Patented June 5, 1917.

Application filed June 21, 1915. Serial No. 35,440.

*To all whom it may concern:*

Be it known that I, PETER W. SOMMER, a citizen of the United States, residing at Peoria, in the county of Peoria and State of Illinois, have invented new and useful Improvements in Gates, of which the following is a specification.

This invention has reference to improvements in gates, and relates particularly to that type of gate known to the trade as flexible gates. Such a gate has its horizontal and vertical reach bars flexibly connected, whereby the latch end of the gate may be adjusted to different elevations and held in such adjusted positions, to enable it to be swung clear of snow and other obstructions, and to permit the passage of small animals, such as sheep and hogs, and prevent the passage of cattle and horses.

My improved gate is designed, either to be elevated at its latch end, or to be wholly raised to any desired height above the ground by means of certain details of construction, combination of parts, and arrangement of devices, and the specific points of novelty in which will be particularly designated in the claim hereto appended.

In the drawings:—

Fig. 2 is a detail, showing a portion of the hinge end of the gate, the stretcher bar and the means for supporting the entire gate in a raised position;

Fig. 3 is a detail, partly in section, showing a portion of the latch end of the gate, and the means for holding the latch end of the gate in adjusted positions, the gate being shown in a substantially horizontal position;

Fig. 4 is a view somewhat similar to Fig. 3, except that the latch end of the gate has been elevated a short distance and is being held in such position, and Fig. 5 is a face view of the member used for holding the latch end of the gate in adjusted positions.

Like characters of reference denote corresponding parts throughout the figures.

Figure 1:
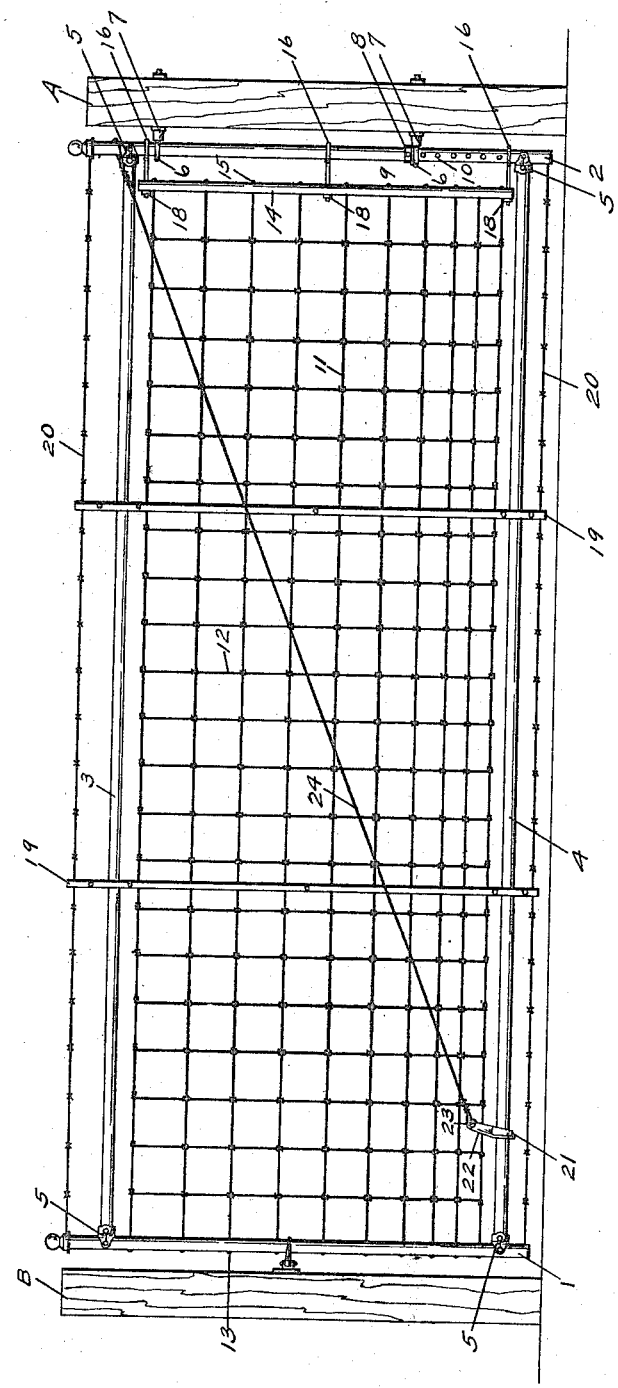
Figure 1 is an elevation of a gate, on a greatly reduced scale, showing my invention applied thereto.

The gate comprises the vertical reach bars 1 and 2, and the horizontal reach bars 3 and 4, the latter having a pivotal connection with the vertical reach bars, as at 5.

The gate is adapted to have a hinge connection with a post A, and when in closed position latched to a post B, by suitable latch connections. The hinge elements comprise eye bolts 6 passing through the post A and spacing castings 7. The reach bar 2 of the gate passes up through the eye bolts 6 and is held at the desired elevation by a collar 8, carried on the reach bar 2, which rests on the lower eye bolt 6, and retained in such position by means of a bolt 9 passing through either one of a number of holes or perforations 10 passing through said reach bar 2. Thus, by means of the eye bolts 6, the holes or perforations 10, the collar 8 and the bolt 9, the entire gate may be raised to different adjusted positions, and held in any such position, while at the same time the latch end may be adjusted, inclining the horizontal reach bars at a suitable angle and so held, if desired, as will be further explained.

The filler for the gate comprises preferably, horizontal wires 11 and vertical stay or picket wires 12, suitably connected where they intersect. The horizontal wires at the latch end of the gate pass through the vertical reach bar 1 and are headed, as at 13. The other ends of such wires pass through a stretcher bar 14 and are headed, as at 15. Eye bolts 16 which receive the reach bar 2 of the gate frame pass through the stretcher bar 14 and are threaded as at 17 to receive the nuts 18. By means of such eye bolts 16 and the nuts 18 the stretcher bar 14 may be adjusted to tighten the wire filler in the gate frame, as will be understood.

I prefer to construct the reach bars, 1, 2, 3, 4, as well as the stretcher bar 14 of tubing, as shown, and by heading the wires 11 at both ends, I not only obviate a loose and unsightly connection of such wires with the parts of the frame, but I also provide a firm and unyielding connection between such wires and the frame, especially the stretcher bar 14, which will not yield or become loosened during the stretching operation, as is the case where the wires are wrapped around the frame parts, or stretcher bar, or similarly attached.

Vertical brace bars, such as 19, may be employed, if desired, as also the top and bottom horizontal brace wires 20.

The means for holding the latch end of the gate frame elevated, comprises a sleeve or collar 21, the same carried upon and having a slidable relation with the lower horizontal reach bar 4, see Figs. 3 and 4. Said sleeve or collar is provided with an extension 22 having an eye 23 with which is connected a wire rod 24, said rod extending diagonally up and across the gate to the upper end of the vertical reach bar 2 to which it is connected.

In operation, the forward or latch end of the gate is raised, during which movement the sleeve or collar 21 is slid along the reach bar 4, and when the desired height has been reached, the frame being released, the sleeve or collar 21 will be tilted at an angle causing it to bind against the bar 4, and thus hold up the end of the gate, as shown in Fig. 4. The sleeve or collar 21 will slide easily on the bar 4 when moved to a position at right angles to said bar 4, the opening in said sleeve or collar having a diameter but little larger than the diameter of the bar 4.

With the means shown the front end of the gate may be raised a suitable height, and held, and be swung on its hinges; also, if desired the gate may be wholly raised to any desired height, and swung on its hinges, and if desired when so raised the front end of the gate may be tilted at a suitable angle. Thus a gate is provided capable of a wide range of adjustment and by means which is exceedingly simple and effective.

What I claim is:—

In a gate, in combination, a frame including upper and lower horizontal tubular reach bars and a pair of spaced vertical tubular reach bars flexibly connected, a collar slidable on the lower horizontal reach bar near its front end, said collar having a diameter but little larger than the diameter of said reach bar, so as to adapt the collar to be inclined on said bar to bind there against, an arm extension connected with said collar and having an eye, a rod connected to the eye of said arm, said rod extending diagonally up and across the gate and connected to the upper end of the rear vertical reach bar above its connection with the upper horizontal reach bar.

PETER W. SOMMER.